(12) United States Patent
Seltzer et al.

(10) Patent No.: US 8,550,810 B2
(45) Date of Patent: Oct. 8, 2013

(54) METHOD OF CONTROLLING A BOILER PLANT DURING SWITCHOVER FROM AIR-COMBUSTION TO OXYGEN-COMBUSTION

(75) Inventors: Andrew Seltzer, Livingston, NJ (US); Zhen Fan, Parsippany, NJ (US); Horst Hack, Hampton, NJ (US)

(73) Assignee: Foster Wheeler North America Corp., Clinton, NJ (US)

( * ) Notice: Subject to any disclaimer, the term of this patent is extended or adjusted under 35 U.S.C. 154(b) by 571 days.

(21) Appl. No.: 12/789,584

(22) Filed: May 28, 2010

(65) Prior Publication Data
US 2011/0294077 A1    Dec. 1, 2011

(51) Int. Cl.
*F23N 1/02* (2006.01)

(52) U.S. Cl.
USPC .................................. 431/12; 431/2; 110/345

(58) Field of Classification Search
USPC ........................................ 431/2, 12; 110/345
See application file for complete search history.

(56) References Cited

U.S. PATENT DOCUMENTS

| | | | | |
|---|---|---|---|---|
| 4,097,218 | A * | 6/1978 | Womack | 431/76 |
| 4,369,026 | A * | 1/1983 | Morgan et al. | 431/12 |
| 4,438,708 | A * | 3/1984 | Duff | 588/321 |
| 5,091,844 | A * | 2/1992 | Waltz | 700/33 |
| 7,303,606 | B2 * | 12/2007 | Zeng et al. | 95/114 |
| 8,007,681 | B2 * | 8/2011 | Farmayan et al. | 252/186.24 |
| 2003/0097840 | A1 * | 5/2003 | Hsu | 60/670 |
| 2007/0231761 | A1 * | 10/2007 | Rosen et al. | 431/350 |
| 2007/0250215 | A1 * | 10/2007 | Jia et al. | 700/274 |
| 2008/0286707 | A1 * | 11/2008 | Panesar et al. | 431/10 |

(Continued)

FOREIGN PATENT DOCUMENTS

| | | |
|---|---|---|
| EP | 1 922 876 A2 | 11/2008 |
| EP | 2 110 604 A2 | 10/2009 |
| WO | 2008/142654 A2 | 11/2008 |

OTHER PUBLICATIONS

International Preliminary Report on Patentability issued Apr. 9, 2013, in counterpart International Patent Application No. PCT/IB2011/052177.

(Continued)

*Primary Examiner* — Kenneth Rinehart
*Assistant Examiner* — Jorge Pereiro
(74) *Attorney, Agent, or Firm* — Fitzpatrick, Cella, Harper & Scinto

(57) ABSTRACT

A method of controlling a boiler plant during a switchover period from an air-combustion mode to an oxygen-combustion mode. The method includes steps of feeding fuel into a furnace of the boiler plant at a rate determined by a fuel feeding scheme, feeding air into the furnace at a rate determined by a descending air feeding scheme, feeding substantially pure oxygen into the furnace at a rate determined by an ascending oxygen feeding scheme, and recirculating flue gas into the furnace at a rate determined by an ascending flue gas recirculating scheme. The fuel feeding scheme, the air feeding scheme and the oxygen feeding scheme are such that the fuel is combusted and the flue gas containing residual oxygen is produced. Also, the fuel feeding scheme, the air feeding scheme and the oxygen feeding scheme are such that the content of residual oxygen in the flue gas is, during at least a portion of the switchover period, greater than during any of the air-combustion mode and the oxygen-combustion mode. The method makes it possible to reduce $CO_2$ emissions and $O_2$ consumption quickly during the short switchover period.

14 Claims, 1 Drawing Sheet

(56) References Cited

U.S. PATENT DOCUMENTS

| | | | |
|---|---|---|---|
| 2009/0061366 A1* | 3/2009 | Rosen et al. | 431/12 |
| 2009/0255450 A1* | 10/2009 | Stone et al. | 110/345 |
| 2009/0260585 A1 | 10/2009 | Hack et al. | |
| 2009/0308073 A1* | 12/2009 | Bonaquist et al. | 60/645 |
| 2009/0311638 A1* | 12/2009 | De Smedt et al. | 431/5 |
| 2010/0183990 A1* | 7/2010 | Watson et al. | 431/8 |
| 2010/0242811 A1* | 9/2010 | Court et al. | 110/203 |
| 2010/0282185 A1* | 11/2010 | Sanchez-Molinero et al. | 122/17.1 |

OTHER PUBLICATIONS

Notification of and International Search Report dated Mar. 5, 2013, which issued in counterpart International Application No. PCT/IB2011/052177, and was mailed Mar. 13, 2013.

Written Opinion mailed on Mar. 13, 2013, which issued in counterpart International Application No. PCT/IB2011/052177.

* cited by examiner

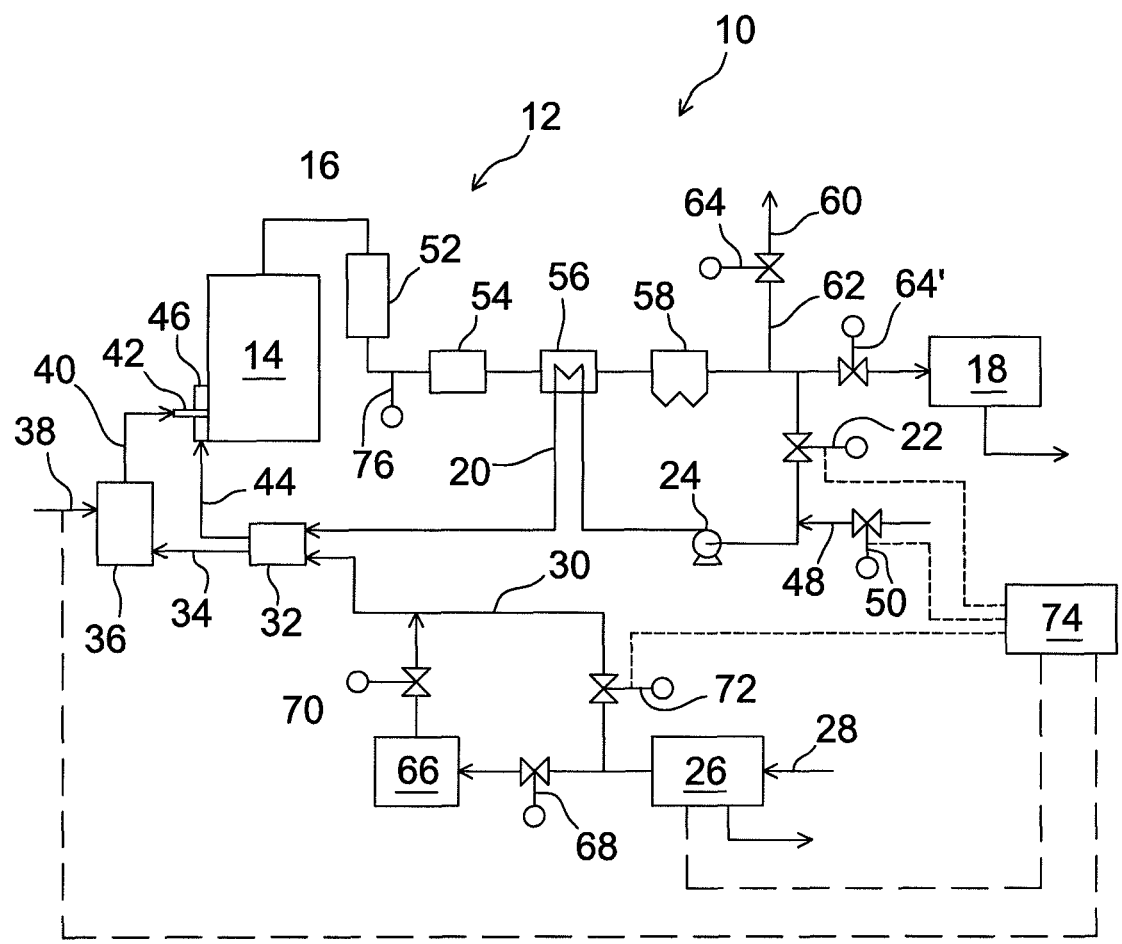

METHOD OF CONTROLLING A BOILER PLANT DURING SWITCHOVER FROM AIR-COMBUSTION TO OXYGEN-COMBUSTION

BACKGROUND OF THE INVENTION

1. Field of the Invention

The present invention relates to a method of controlling a boiler plant during a switchover period from an air-combustion mode to an oxygen-combustion mode. The invention particularly relates to a method comprising the steps of feeding solid carbonaceous fuel into a furnace of the boiler plant at a rate determined by a fuel feeding scheme, feeding air into the furnace at a rate determined by a descending air feeding scheme, feeding substantially pure oxygen into the furnace at a rate determined by an ascending oxygen feeding scheme, and recirculating flue gas into the furnace at a rate determined by an ascending flue gas recirculating scheme, wherein the fuel feeding scheme, the air feeding scheme and the oxygen feeding scheme are such that the fuel is combusted and flue gas containing residual oxygen is produced.

2. Description of the Related Art

Coal-fired power plants currently account for more than 40% of man-made world-wide carbon dioxide emissions. Oxygen-combustion, also called oxyfuel combustion, is one of the generally known methods of removing carbon dioxide from the exhaust gas of a power plant combusting coal, or other solid carbonaceous fuels. Oxygen-combustion is based on combusting solid carbonaceous fuel with substantially pure oxygen, to produce carbon dioxide and water vapor as the main components of the flue gas. This allows the carbon dioxide to be much more easily captured from the flue gas than in air-combustion, where nitrogen is the dominant flue gas component.

In oxygen-combustion, the fuel is advantageously combusted by using an oxidant consisting of substantially pure oxygen, obtained from an air separation unit (ASU), mixed with recycled flue gas. The products of combustion are then only $CO_2$, water vapor, and a relatively small amount of impurities. The water vapor is condensed in the flue gas channel, yielding a nearly-pure $CO_2$ stream ready for sequestration. The $CO_2$ effluent is then cooled and compressed to high pressure, and the resultant liquid or supercritical $CO_2$ is piped from the plant to be sequestered in geologic formations. The use of an oxidant consisting of oxygen and recycled flue gas renders it possible to adjust the combustion conditions to nearly similar to those of conventional air-combustion boilers.

Due to the uncertainties in, for example, the $CO_2$ capture and storage technology, there is a need for boilers that can be changed from air-combustion to oxygen-combustion, and vice-versa, with minimal changes in the plant equipment. Correspondingly, it is advantageous to be able to operate an oxygen-combustion boiler in an air-combustion mode, for example, when the ASU, $CO_2$ purification and compression unit (CPU), or $CO_2$ storage system is unavailable. Moreover, the flexibility to operate a boiler in either an air-combustion or an oxygen-combustion mode allows adjustment of plant operation to a changing and unknown market for carbon-free electricity, and will promote faster adoption of carbon capture and sequestration technology.

A boiler design that is capable of running on either air-combustion or oxygen-combustion is adaptable to a new boiler or a retrofit of an existing boiler. By properly selecting the flue gas recirculation flow rate, the same boiler geometry, materials, and burners, etc., can be used in both air-combustion and oxygen-combustion modes at all loads. The oxygen-combustion process can readily be retrofitted to an existing boiler by adding the flue gas recycling equipment, the air separation unit, and the $CO_2$ compression and purification equipment.

It would be useful to be able to switch a boiler from air-combustion or oxygen-combustion online, i.e., without interrupting or seriously distracting the combustion process. Especially, when using a process where an oxygen-combustion boiler is started with air-combustion, it is necessary to be able to safely switch online, at full load or partial load, from air-combustion to oxygen-combustion. During the switchover period, the flue gas will be purged to the stack instead of the CPU, until the flue gas reaches a certain $CO_2$ concentration. Thus, in order to reduce $O_2$ consumption and $CO_2$ emission, a fast switchover is desired. A fast switchover, however, tends to adversely affect the boiler performance, such as superheat and reheat steam temperatures. Thus, there is a need for proper dynamic control to assure continuous and safe operation of the plant during a fast switchover from air-combustion or oxygen-combustion.

SUMMARY OF THE INVENTION

An object of the present invention is to provide a method of controlling a boiler plant during a switchover period from an air-combustion mode to an oxygen-combustion mode.

Another object of the present invention is to allow a fast switchover from an air-combustion mode to an oxygen-combustion mode, in order to reduce $CO_2$ emission and $O_2$ consumption during the switchover period.

In order to obtain this and other objects, the present invention provides a method of controlling a boiler plant during a switchover period from air-combustion mode to an oxygen-combustion mode. The method comprises the steps of feeding fuel into a furnace of the boiler at a rate determined by a fuel feeding scheme, feeding air into the furnace at a rate determined by a descending air feeding scheme, feeding substantially pure oxygen into the furnace at a rate determined by an ascending oxygen feeding scheme, and recirculating flue gas into the furnace at a rate determined by an ascending flue gas recirculating scheme, wherein the fuel feeding scheme, the air feeding scheme and the oxygen feeding scheme are such that the fuel is combusted, and flue gas consisting of an amount of residual oxygen is produced, and wherein the fuel feeding scheme, the air feeding scheme and the oxygen feeding scheme are such that the content of residual oxygen in the flue gas is, during at least a portion of the switchover period, greater than during any of the air-combustion mode and the oxygen-combustion mode.

When combusting solid carbonaceous fuel in a boiler, for example, in a PC-boiler or a CFB-boiler, the oxygen feeding rate is generally slightly higher than what is theoretically needed for complete combustion of the fuel. The amount of unburned carbon in the ash discharged from the furnace of a boiler, as well as overall emissions of carbon monoxide and $NO_x$ are generally minimized when the oxidant feeding rate is such that the flue gas discharged from the furnace contains about 3-4% oxygen, so-called residual oxygen.

The oxygen/fuel ratio, i.e., the ratio of the feeding rates of oxygen and fuel, is advantageously adjusted during the switchover period, so that the amount of residual oxygen in the flue gas is, during at least a portion of the switchover period, greater, preferably, at least 100% greater, and more preferably, at least 200% greater, than during any of the air-combustion mode and the oxygen-combustion mode. The residual oxygen level is advantageously obtained by increasing the oxygen feeding rate so as to provide a fast response through increasing the combustion rate of the boiler by combusting accumulated fuel, such as char in a CFB bed or coal in a coal mill.

The content of residual oxygen during the air-combustion mode and oxygen-combustion mode refers here to a typical, or aimed, residual oxygen content of the flue gas during a steady state air-combustion process before the switchover period and during a steady state oxygen-combustion process after the switchover period. Typically, the residual oxygen content of the flue gas is, according to the present invention, during at least a portion of the switchover period, clearly greater than 3-4%, preferably, at least 6-8%, and even more preferably, at least 9-12%. By this way, a short switchover period, for example, about five minutes, can be reached, which significantly reduces the $CO_2$ emission and $O_2$ consumption during switchover.

According to a simulation calculation, a smooth, safe and fast switchover from air-combustion to oxygen-combustion was obtained when the residual oxygen content of the flue gas was about 16% during a portion of the switchover period. It was surprisingly observed in the simulation calculation that such a high residual oxygen level is desired in order to achieve smooth changing of the furnace outlet temperature, to minimize unburned fuel in the ash, and to maintain a desired power plant output during the switchover.

The residual oxygen content of the flue gas may advantageously vary during the switchover period so that it corresponds at the beginning and at the end of the switchover period to the aimed residual oxygen content during the air-combustion mode and oxygen-combustion mode, respectively, but is, during a central portion of the switchover period, greater than during any of the air-combustion mode and the oxygen-combustion mode. According to a preferred embodiment of the present invention, the amount of residual oxygen is, during a central fourth of the switchover period, greater, preferably, at least 100% greater, and more preferably, at least 200% greater, than during any of the air-combustion mode and the oxygen combustion mode. A central fourth of the switchover period here refers to a portion of the switchover period, which lasts a fourth of the duration of the switchover period and extends to the point of time being at the center of the switchover period. Naturally, the length of the portion of the switchover period having an increased residual oxygen content may be longer than a fourth of the switchover period. The limit, one fourth, states only an advantageous minimum length of the portion of the switchover period having an increased residual oxygen content.

According to another preferred embodiment of the present invention, the amount of residual oxygen is, during a third of the switchover period, located mostly at the second portion of the switchover period, greater, preferably at 100% greater, more preferably, at least 200% greater, than during any of the air-combustion mode and the oxygen-combustion mode. A third of the switchover period, located mostly at the second portion of the switchover period, here refers to a portion of the switchover period, which lasts a third of the duration of the switchover period and extends for more than one half of its duration after the point of time at the center of the switchover period. Naturally, the length of the portion of the switchover period having an increased residual oxygen content may be longer than a third of the switchover period.

The main feature of the switchover period is that the air feeding rate decreases from an initial value to zero, and the oxygen feeding rate increases from zero to a final value. Moreover, in order, for example, to maintain the furnace temperature at a suitable level, the flue gas recirculation rate increases from a small value, typically, from zero, to a final value, which typically corresponds to 70-80% of the flue gas flow.

Assuming that there is no particular reason to decrease the output power of the boiler plant during the switchover from air-combustion to oxygen-combustion, the fuel feeding rate may be maintained at a constant level from the end of the air-combustion mode to the beginning of the oxygen-combustion mode, i.e., throughout the switchover period. However, the fuel feeding rate may, advantageously, be increased when switching from air-combustion to oxygen-combustion, so as to minimize the decrease of the output power of the plant, as described in U.S. patent application publication number 2009/0260585 A1. Moreover, according to a preferred embodiment of the present invention, the fuel feed rate is increased during the switchover period, so as to maintain superheater and reheater outlet temperatures during the switchover period within acceptable limits.

If the fuel feeding rate is changed, it may advantageously be changed at the beginning of the switchover period, to be then maintained constant during the switchover period. Alternatively, the fuel feeding rate may be changed during the switchover period according to another advantageous scheme. Coal accumulation in a coal mill of a PC-boiler, or bed char inventory of a CFB-boiler, can be utilized in parallel to a fuel feed rate adjustment to obtain a fast increase in the fuel combustion rate, if desired. By controlling superheater and reheater temperatures during switchover from air-combustion to oxygen-combustion, metal material damage can be avoided and power plant output can be maintained. By maintaining a minimum acceptable content of residual oxygen in the flue gas, unburned fuel can be minimized and power plant output can be maintained.

According to a preferred embodiment of the present invention, the air feeding rate descends from an initial value to zero according to a predetermined, approximately linear scheme. The descending air feeding scheme deviates during the switchover period from a linear descent, from the initial value at the beginning of the switchover period to zero, preferably, by at most 40%, even more preferably, by at most 20%, of the air feeding rate at the beginning of the switchover period.

According to another preferred embodiment of the present invention, the flue gas recycling rate ascends from zero to a final value according to a predetermined, approximately linear scheme. The ascending flue gas recycling scheme deviates during the switchover period from a linear ascent, from zero to the final value, the value at the beginning of the oxygen-combustion mode, preferably, by at most 40%, even more preferably, by at most 20%, of the final flue gas recycling rate at the beginning of the oxygen-combustion mode.

The fuel feeding scheme, air feeding scheme, oxygen feeding scheme and flue gas recirculating scheme are advantageously such that the mass flow rate of the flue gas is approximately constant during the switchover period. Preferably, in order to obtain a smooth transition from air-combustion to oxygen-combustion, the deviations in the mass flow rate of the flue gas discharged from the furnace during the switchover period are within 10% of the average of the mass flow rate of the flue gas.

The content of the residual oxygen in the flue gas may advantageously be increased during the switchover period by suitably increasing the feeding rate of substantially pure oxygen into the furnace. It may, however, not be possible to obtain a sufficiently increased stream of oxygen from an ASU. Therefore, according to a preferred embodiment of the present invention, the boiler plant comprises a storage of oxygen, preferably, a storage of liquid oxygen, and during the switchover period, at least a portion of the substantially pure oxygen is fed to the furnace from the oxygen storage. The oxygen may be stored into the oxygen storage at any time before the switchover period. However, oxygen is advantageously stored into the oxygen storage during the air-combustion mode.

According to the present invention, the fuel feeding scheme, the air feeding scheme and the oxygen feeding scheme are not independent, but they are related so that the residual oxygen in the flue gas is, during at least a portion of the switchover period, greater than that during any of the air-combustion mode and oxygen-combustion mode. Thus, the ratio of the total oxygen fed to the furnace, i.e., oxygen from the air and oxygen from the substantially pure oxygen, to the fuel fed to the furnace is such that the desired level of residual oxygen in the flue gas is obtained. Once the period of the switchover is complete, the fuel feeding rate and the oxygen/coal ratio will be maintained at the steady state value.

The above brief description, as well as other objects, features and advantages of the present invention will be more fully appreciated by reference to the following detailed description of the currently preferred, but nonetheless illustrative, embodiments and examples of the present invention, taken in conjunction with the accompanying drawing.

BRIEF DESCRIPTION OF THE DRAWING

FIG. 1 is a schematic diagram of an oxyfuel combustion boiler plant in accordance with an embodiment of the present invention.

DETAILED DESCRIPTION OF THE INVENTION

FIG. 1 shows a schematic diagram of an oxygen-combustion boiler plant 10 in accordance with an embodiment of the present invention. The boiler plant 10 comprises a PC-boiler 12 with a furnace 14, a flue gas channel 16 leading to a $CO_2$ purification and compression unit (CPU) 18, and a flue gas recycling channel 20. The flue gas recycling channel comprises means, such as a damper 22 and a variable speed fan 24, for controlling the flue gas circulation rate.

The boiler plant 10 comprises an air separation unit (ASU) 26, which produces a stream of substantially pure oxygen by separating nitrogen from a stream of air 28. An oxygen channel 30 leads the stream of substantially pure oxygen from the ASU to a mixer 32, where the oxygen is mixed with recycled flue gas from the flue gas recycling channel 20. The mixer produces primary oxidant gas, which is led along a primary oxidant channel 34 to a coal mill 36. A feed stream of coal 38 is crushed in the coal mill 36 to pulverized coal, which is conducted together with the primary oxidant gas along a fuel feeding channel 40 to a burner 42 attached to the furnace 14. In practice, there are multiple burners attached to the furnace 14, but, for the sake of simplicity, only one is shown in FIG. 1. The coal is combusted in the furnace 14 by the primary oxidant gas and a secondary oxidant gas, which is led from the mixer 32 via a secondary oxidant channel 44 and a wind box 46 to the furnace. Part of the substantially pure oxygen, as required, may be fed to the burner 42 directly, without being mixed with the recirculated gas.

The boiler plant 10 also comprises an inlet for air 48, so as to render possible to use, when desired, air as an oxidant, instead of a mixture of oxygen and recycled flue gas. The inlet for air 48 is advantageously connected to the flue gas recycling channel 20, but it may alternatively be connected to the boiler 12 with, for example, a separate air channel. The inlet for air 48 comprises means, such as a damper 50, for controlling the rate of feeding air.

The flue gas channel 16 leads flue gas from the furnace 14 via heat exchange surfaces, such as conventional superheaters and reheaters 52, economizers 54, a gas-gas heat exchanger 56, used for heating recycled flue gas or air, and gas cleaning units, such as a dust separator 58, to the CPU 18. The flue gas channel 16 may also comprise other flue gas cleaning units, such as an $NO_x$ catalyst or a sulfur capturing unit, but they are not shown in FIG. 1, because they are not relevant for the present invention.

A stack 60 for leading cleaned flue gas to the environment is also connected to a side branch 62 of the flue gas channel 16. Flue gas can be conducted to the stack 60 in case the CPU 18 is not in use, for example, when starting-up the boiler plant 10, or when the boiler plant 10 is used in an air-combustion mode. The side branch 62 and the end portion of the flue gas channel 16 are equipped with means, such as dampers 64, 64', for directing the flue gas either to the CPU 18 or to the stack 60.

An oxygen storage 66, with an inlet damper 68 and an outlet damper 70, is advantageously connected parallel with a portion of the oxygen channel 30. By opening the inlet damper 68 while closing or throttling a damper 72 arranged in the oxygen channel 30, it is then possible to store oxygen produced in the ASU 26 into the oxygen storage 66, when the boiler plant is in the air-combustion mode, or the oxygen demand is less than the production capability of the ASU. The stored oxygen can then be used for combustion, by opening the damper 70, when the oxygen demand is higher than the production capability of the ASU.

The operation mode of the boiler plant 10 is controlled by a control unit 74. While the boiler plant is in an oxygen-combustion mode, the ASU 26 is operating, the damper 72 in the oxygen channel is open, the damper 50 for controlling the feeding of air is closed, the damper 22 in the flue gas recycling channel 20 is open, the fan 24 in the recycling channel 20 is operating, the CPU 18 is operating, the damper 64' in the end portion of the gas channel is open, and the damper 64 in the side branch 62 of the flue gas channel 16 is closed. Correspondingly, when the boiler plant 10 is in the air-combustion mode, the ASU 26 does not have to be operating, the damper 72 in the oxygen channel 30 is closed, the damper 50 for controlling the feeding of air is open, the damper 22 in the flue gas recycling channel 20 is closed or nearly closed, the fan 24 in the recycling channel is operating, the CPU 18 is not operating, the damper 64' in the end portion of the flue gas channel 16 is closed, and the damper 64 in the side branch 62 of the flue gas channel 16 is open.

During a switchover from the air-combustion mode to the oxygen-combustion mode, the feeding of air to the furnace 14 is gradually decreased to zero by gradually closing the damper 50 for controlling the feeding of air. Simultaneously, the feeding of oxygen to the furnace 14 is gradually increased by gradually opening the damper 72 in the oxygen channel 30, after starting the operation of the ASU. Simultaneously, the recycling of the flue gas is also started, or increased, by gradually opening the damper 22 in the flue gas recycling channel 20. The feeding of coal along the fuel feeding channel 40 is advantageously increased to a higher level during the switchover, but it may, in some applications, also be maintained at a constant level.

According to the present invention, the feeding of coal, oxygen and air are advantageously controlled during the switchover period from air-combustion to oxygen-combustion by the control unit 74, so as to increase the level of residual oxygen in the flue gas channel during at least a portion of the switchover period, to be clearly higher than typically during the operation of the boiler in any of the air-combustion mode and the oxygen-combustion mode. The change of the coal, oxygen and air feeding rates, as well as the flue gas recycling rate is advantageously based on predetermined schemes, which are known to result in the desired residual oxygen level. The descending air feeding scheme and the ascending flue gas recycling scheme are advantageously approximately linear functions, but they may, in some cases, also be of some other suitable form. The actual residual oxygen level in the flue gas is advantageously measured by a sensor 76 arranged in the flue gas channel 16, so as to adjust the above-mentioned schemes.

The present invention is described above in connection with an oxyfuel-combustion PC-boiler, but the invention can, as well, be used in a CFB boiler. Then, as is clear to a person skilled in the art, the fuel is not limited to coal, but it may, alternatively, be other kinds of solid fuel, such as, for example, biofuel or waste derived fuel. As is generally known, the means for feeding fuel and oxidant differ in the case of a CFB boiler from that of a PC-boiler, but the main features of the present invention, as described above, are essentially unchanged.

While the invention has been described herein by way of examples in connection with what are, at present, considered to be the most preferred embodiments, it is to be understood that the invention is not limited to the disclosed embodiments, but is intended to cover various combinations or modifications of its features, and several other applications included within the scope of the invention as defined in the appended claims.

We claim:

1. A method of controlling a boiler plant during a switchover period from an air-combustion mode to an oxygen-combustion mode, the method comprising the steps of:
   (a) feeding fuel into a furnace of the boiler plant at a rate determined by a fuel feeding scheme;
   (b) feeding air into the furnace at a rate determined by a descending air feeding scheme;
   (c) feeding substantially pure oxygen into the furnace at a rate determined by an ascending oxygen feeding scheme; and
   (d) recirculating flue gas into the furnace at a rate determined by an ascending flue gas recirculating scheme,
   wherein (i) the fuel feeding scheme, the air feeding scheme, and the oxygen feeding scheme are such that the fuel is combusted and flue gas containing residual oxygen is produced, (ii) the fuel feeding scheme, the air feeding scheme, and the oxygen feeding scheme are such that the content of the residual oxygen in the flue gas is, during at least a portion of the switchover period, greater than during any of the air-combustion mode and the oxygen-combustion mode, and (iii) the amount of the residual oxygen is, during at least a portion of the switchover period, at least 100% greater than during any one of the air-combustion mode and the oxygen-combustion mode.

2. The method according to claim 1, wherein the amount of residual oxygen is, during at least a portion of the switchover period, at least 200% greater than during any one of the air-combustion mode and the oxygen-combustion mode.

3. The method according to claim 2, wherein the amount of residual oxygen is, during at least a central fourth of the switchover period, at least 200% greater than during any of the air-combustion mode and the oxygen combustion mode.

4. The method according to claim 3, wherein the amount of residual oxygen is, during at least a third of the switchover period, scheduled mostly at the second portion of the switchover period, at least 200% greater than during any of the air-combustion mode and the oxygen-combustion mode.

5. The method according to claim 1, wherein the amount of residual oxygen is, during at least a central fourth of the switchover period, at least 100% greater than during any of the air-combustion mode and the oxygen-combustion mode.

6. The method according to claim 5, wherein the amount of residual oxygen is, during at least a third of the switchover period, scheduled mostly at the second portion of the switchover period, at least 100% greater than during any of the air-combustion mode and the oxygen-combustion mode.

7. The method according to claim 1, wherein the boiler plant comprises an oxygen storage, and, during the switchover period, at least a portion of the substantially pure oxygen is fed to the furnace from the oxygen storage.

8. The method according to claim 7, wherein oxygen is stored into the oxygen storage during the air-combustion mode.

9. The method according to claim 1, wherein the descending air feeding scheme deviates from a linear descent to zero by at most 40% of the air feeding rate at the beginning of the switchover period.

10. The method according to claim 9, wherein the descending air feeding scheme deviates from a linear descent to zero by at most 20% of the air feeding rate at the beginning of the switchover period.

11. The method according to claim 1, wherein the ascending flue gas recycling scheme deviates from a linear ascent from zero to a flue gas recycling rate at the beginning of the oxygen-combustion mode by at most 40% of the flue gas recycling rate at the beginning of the oxygen-combustion mode.

12. The method according to claim 11, wherein the ascending flue gas recycling scheme deviates from a linear ascent from zero to a flue gas recycling rate at the beginning of the oxygen-combustion mode by at most 20% of the flue gas recycling rate at the beginning of the oxygen-combustion mode.

13. The method according to claim 1, wherein the fuel feeding scheme is substantially constant and is equal to the fuel feeding rate at the beginning of the oxygen-combustion mode.

14. The method according to claim 1, wherein the fuel feeding scheme, the air feeding scheme, the oxygen feeding scheme, and the flue gas recirculating scheme are such that deviations in the mass flow rate of the flue gas discharged from the furnace during the switchover period are within 10% of the average.

* * * * *